N. H. HORNE.
TIRE.
APPLICATION FILED JULY 19, 1911.

1,027,733.

Patented May 28, 1912.

3 SHEETS—SHEET 1.

Witnesses

Inventor
Newton H. Horne.
By
Attorneys.

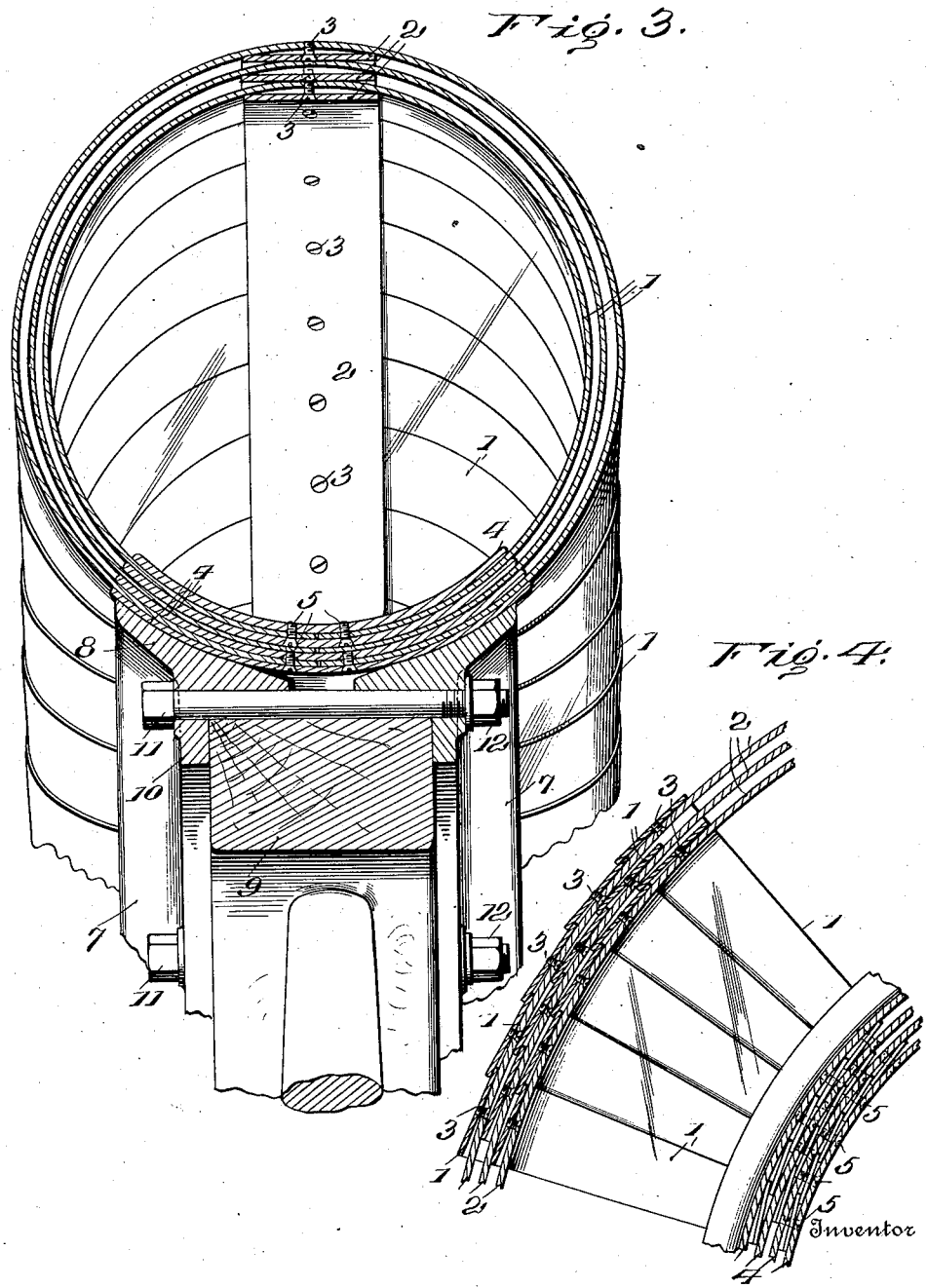

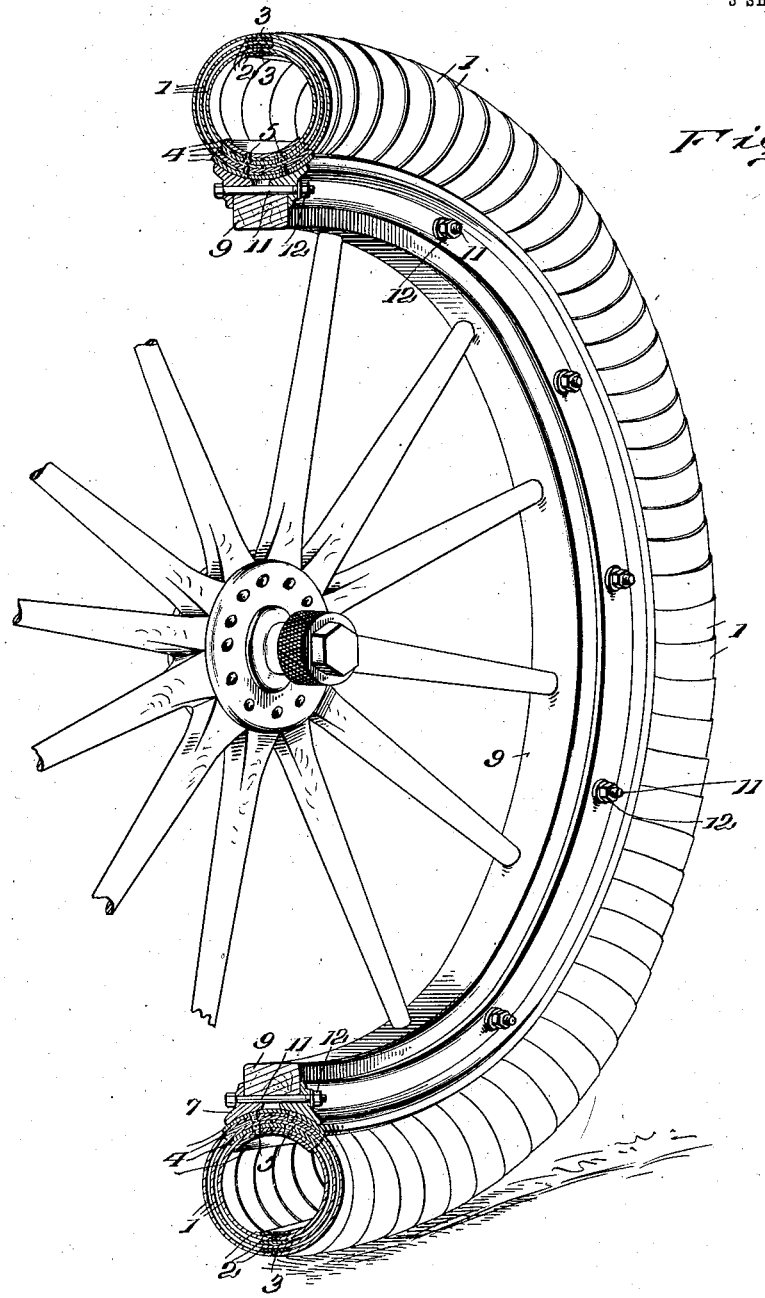

UNITED STATES PATENT OFFICE.

NEWTON H. HORNE, OF KANSAS CITY, MISSOURI.

TIRE.

1,027,733.  Specification of Letters Patent.  Patented May 28, 1912.

Application filed July 19, 1911. Serial No. 639,385.

*To all whom it may concern:*

Be it known that I, NEWTON H. HORNE, citizen of the United States, residing at Kansas City, in the county of Jackson and State of Missouri, have invented certain new and useful Improvements in Tires, of which the following is a specification.

This invention comprehends certain new and useful improvements in resilient wheels and tires, and the invention has for its primary object a simple, durable and efficient construction of resilient tire constructed of springs and connecting bands and rims designed to take the place of the ordinary rubber pneumatic tires which are so liable to become punctured, rim-cut and otherwise unfit for use, and to effectively absorb the shocks and jars to which the wheels of an automobile or other vehicle are constantly subjected when in use.

The invention also has for its object an improved construction of spring tire the parts of which may be easily and quickly assembled and secured firmly together ready to apply to the wheel, and the invention further aims to generally improve this class of devices and render them more useful and commercially desirable.

With these and other objects in view, as will more fully appear as the description proceeds, the invention consists of certain constructions, arrangements and combinations of the parts that I shall hereinafter fully describe and claim.

Figure 1:
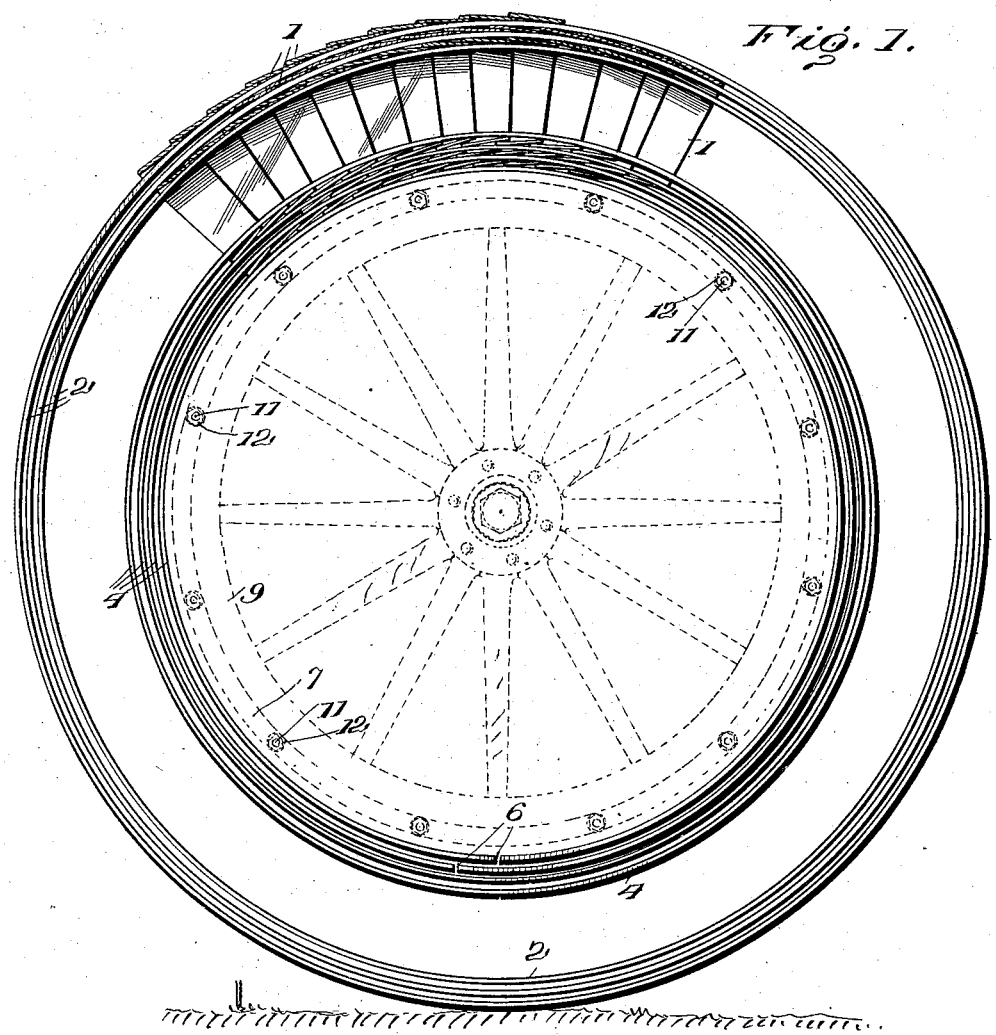
Figure 2:
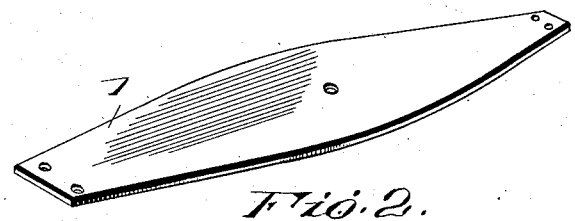

For a full understanding of the invention, reference is to be had to the following description and accompanying drawings in which:

Figure 1 is a side elevation of a wheel equipped with my improved tire, the practically continuous bands and rims being shown entire and only some of the springs being shown, the fastening devices that secure the springs to the rims and bands being omitted in this view; Fig. 2 is a detail perspective view of one of the springs in its blank or initial form; Fig. 3 is an enlarged transverse sectional view of the tire and felly of the wheel; Fig. 4 is a fragmentary longitudinal section of the tire; and Fig. 5 is a sectional perspective view of the tire applied to a wheel.

Corresponding and like parts are referred to in the following description and indicated in all the views of the accompanying drawings by the same reference characters.

My improved resilient tire embodies any desired number of transversely bowed and substantially circular springs 1 of steel or other suitable metal, one of which is shown in blank form in Fig. 2. The ends of the springs 1 substantially abut at the inner side of the tire as best illustrated in Fig. 3. In the present embodiment of the invention there are three sets or layers of these springs, the springs of one set overlapping each other and breaking joint with the springs of the next adjacent set, as best illustrated in Figs. 1 and 4. It is to be understood that my invention is not limited to three sets of springs, as the number of springs and other parts hereinafter described and the size thereof, will of course depend upon the load the tire is intended to carry and the strength and resiliency necessary.

Secured to the inner side of the respective sets of springs 1 are circumferentially extending endless spring tread rims 2 also composed of spring steel or the like, the spring tread rims being preferably the same width as the springs, although it is to be understood that the invention is not limited in this regard. The spring tread rims 2 may be secured to the springs 1 in any desired way as by screws 3 working outwardly through the said bands into the outer lying springs. And bands are located at the tread portion of the tire, as will best be seen by reference to Figs. 3 and 5.

The inner ends of the springs 1 are secured to transversely bowed rim bands 4, by screws 5 or similar fastening devices, there being four of these rim bands in the present instance, one on the inner side of the sets of springs, another on the outer side of the sets of springs and the other two being interposed between the sets. It is of course to be understood that the tire is built up, layer upon layer and it will therefore be seen that the two innermost rim bands 4 must necessarily be split as indicated at 6. The two outermost rim bands 4 may be continuous (see Fig. 1). In using the terms "inner" and "outer" in this connection it is to be understood that the center of the wheel is considered, the outermost rim bands being those farthest from the hub or center.

In order to secure my improved tire to the wheel, I preferably employ two continuous side rings 7 each of which is formed with a concave wedging surface 8 adapted to extend in over the felly 9, and an inwardly extending flange 10 adapted to clamp the sides of the felly so as to hold the tire as against lateral displacement. In applying the tire, one of these rings 7 is placed against the felly, the tire is then put on, and the other ring 7 is then placed against the opposite side of the felly, the two rings being drawn together by bolts 11 and nuts 12 working on the bolts, the bolts extending transversely as shown across the outer side of the felly, whereby, as the two rings are drawn together they will wedge in between the felly and the tire and tend to securely hold the latter in place.

From the foregoing description in connection with the accompanying drawings, it will be seen that I have provided a spring tire which will be practically indestructible, as well as efficient and possessing the required characteristic of resiliency.

Having thus described the invention, what I claim as new is:

A spring tire, consisting of a plurality of sets of radially superimposed transversely bowed springs, said springs having their ends disposed innermost, the springs of each set overlapping each other and the springs of one set breaking joint with the springs of an adjacent set, circumferentially extending spring tread bands secured in radial alinement with each other to the springs, and transversely bowed circumferentially extending rim bands secured in radial alinement with each other to the springs at the inner ends thereof, both ends of the springs being secured to said rim bands in bowed relation to each other.

In testimony whereof, I affix my signature in presence of two witnesses.

NEWTON H. HORNE. [L. S.]

Witnesses:
W. N. WOODSON,
FREDERICK S. STITT.

---

Copies of this patent may be obtained for five cents each, by addressing the "Commissioner of Patents, Washington, D. C."